C. R. BRYANT.
PISTON PACKING RING.
APPLICATION FILED AUG. 17, 1916.
1,262,631. Patented Apr. 16, 1918.
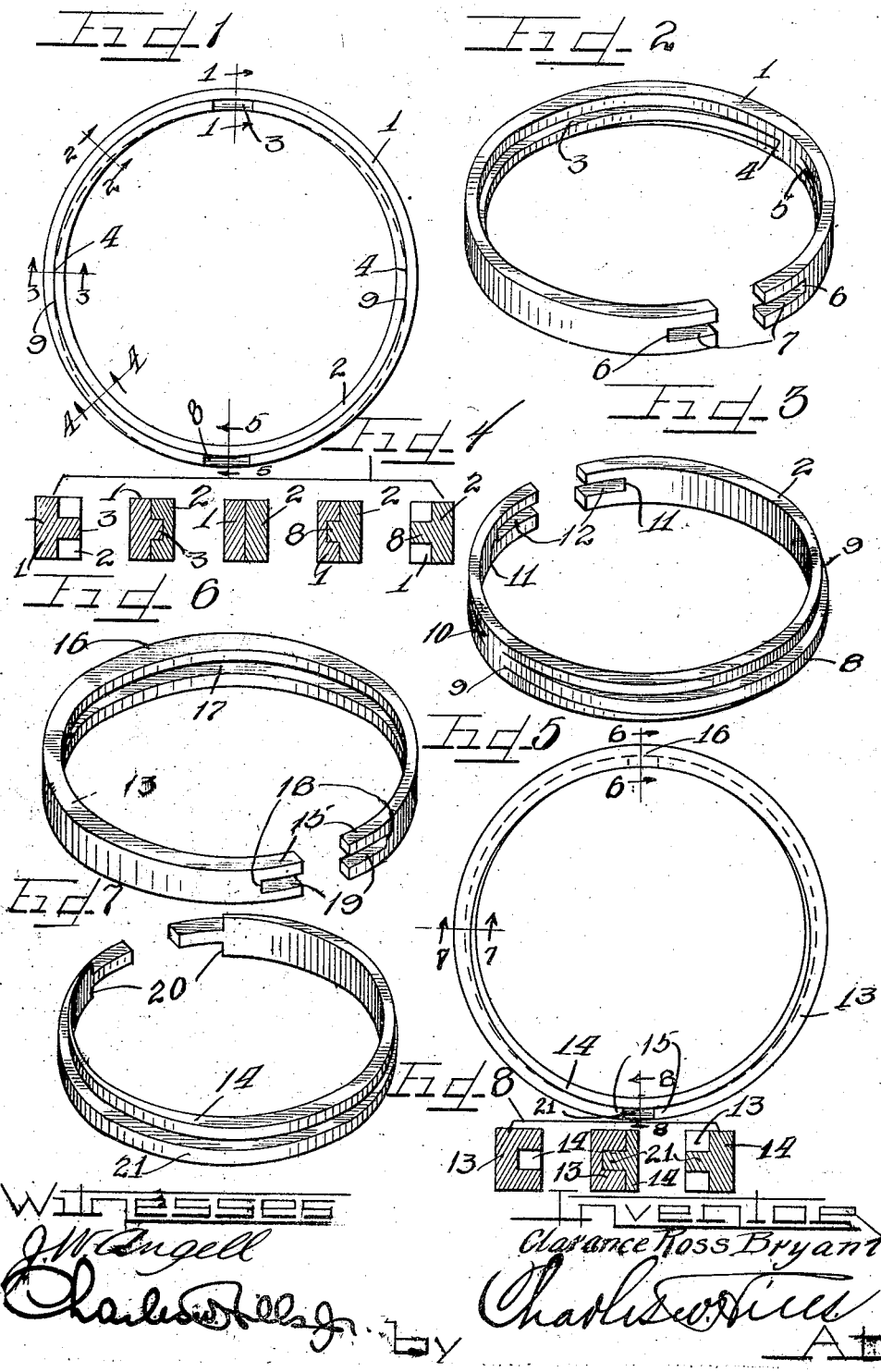

UNITED STATES PATENT OFFICE.

CLARANCE R. BRYANT, OF CHICAGO, ILLINOIS, ASSIGNOR TO D. B. BYRNS, OF CHICAGO, ILLINOIS.

PISTON PACKING-RING.

1,262,631.  Specification of Letters Patent.  Patented Apr. 16, 1918.

Original application filed August 10, 1915, Serial No. 44,786. Divided and this application filed August 17, 1916. Serial No. 115,393.

*To all whom it may concern:*

Be it known that I, CLARANCE ROSS BRYANT, a citizen of the United States, and a resident of the city of Chicago, in the county of Cook and State of Illinois, have invented certain new and useful Improvements in Piston Packing-Rings; and I do hereby declare that the following is a full, clear, and exact description of the same, reference being had to the accompanying drawings, and to the numerals of reference marked thereon, which form a part of this specification.

This application for patent constitutes a division of my Letters Patent No. 1,191,276, for improvements in packing rings, granted July 18, 1916.

This invention relates to improvements in a piston packing ring especially adapted for use in connection with the pistons of engines in general to produce a fluid tight contact between the piston and inside wall of the cylinder thereby obtaining better compression and a higher efficiency, and insuring against danger of leakage as the packing ring is constructed with a practically continuous working face, leaving no opening through which the fluid or pressure may escape.

It is an object of this invention to provide a piston packing ring comprising eccentric interfitting members.

It is also an object of this invention to provide a piston packing ring comprising eccentric interfitting members adapted to produce a complete ring having the outer and inner faces thereof concentric.

It is a further object of this invention to construct a piston packing ring wherein an inner and an outer eccentric split member are each formed with a rib and a groove, said members adapted to interfit one another to afford a ring having a practically continuous working face.

It is furthermore an object of this invention to provide a piston packing ring wherein an outer and an inner split member are provided with a groove and an integral rib respectively eccentric to one another and adapted to interfit to afford a circumferential interlock between said split members, thereby preventing a relative rotative movement therebetween, and producing a ring of uniform thickness throughout having its outer and inner surfaces concentric.

It is finally an object of this invention to construct a piston packing ring simple in construction adapted to afford a better compression and a higher efficiency.

The invention (in a preferred form) is illustrated in the drawings and hereinafter more fully described.

In the drawings:

Figure 1 is a plan view of a packing ring embodying the principles of my invention.

Fig. 2 is a perspective view of the outer member of the device.

Fig. 3 is a similar view of the inner member.

Fig. 4 comprises a series of detail sectional views taken on lines 1—1, 2—2, 3—3, 4—4 and 5—5, of Fig. 1.

Fig. 5, is a plan view of a modified form of the device.

Fig. 6 is a perspective view of the outer member thereof.

Fig. 7 is a similar view of the inner member.

Fig. 8 comprises a series of detail sections taken on lines 6—6, 7—7, and 8—8, of Fig. 5.

As shown in the drawings:

The piston packing ring comprises an outer ring member 1, and an inner ring member 2, of uniform thickness interfitting one another. Said outer ring member 1, has a smooth outer face, and a flat top and bottom and is of the split or interrupted type, having integrally formed on the inner face thereof a circumferentially extending rib 3, the central portion thereof being opposite the split in said ring member. The rib 3, extends approximately half way around the central portion of the ring, being thickest at its center and tapering therefrom in both directions to the points 4, which are about diametrically opposite each other. Starting a short distance from the points 4, on the inner face of the ring member 1, and extending at a gradually increasing depth to the extremities of said ring member, are circumferential grooves 5, in longitudinal or in circumferential alinement with the rib 3, the grooves 5, terminating in feather edges at the points 6, thereby leaving open ended slots 7. Said rib 3, and the grooves 5, are arranged centrally between the top and bottom edges of the ring member 1.

The inner ring member 2, has a smooth inner face and a flat top and bottom surface, and is also of the split or interrupted type, having integrally formed on its outer face a central circumferential rib 8, which is thickest at its middle, opposite the split in said ring member, and gradually tapers therefrom in both directions toward the extremities where it merges into the outer face thereof at about diametrically opposite points 9. The ring member 2, has formed or cut in the outer face thereof, circumferential grooves 10, arranged in longitudinal alinement with the rib 8, gradually increasing in depth toward the extremities of the ring member, and terminating in feather edges at points 11, leaving open ended slots 12, at the free extremities of the ring member. Said rib 8, and the grooves 10, are arranged centrally between the top and bottom edges of the ring member 2.

In the modified form of the piston packing ring shown in Figs. 5 to 8, inclusive, the numeral 13, represents an outer ring member, and the numeral 14, designates an inner ring member. Said outer and inner ring members 13 and 14, are of the split or interrupted type and are made eccentric, tapering from a middle point toward their extremities. The outer ring member 13, is thickest at the middle thereof and gradually tapers toward its extremities 15, which are approximately half the thickness of the complete ring, while the middle portion, denoted by the reference numeral 16, is equal to the full width of the complete packing ring. The outer ring member 13, has formed in its inner face an annular groove or recess 17, of the same depth throughout its length, the same terminating in feather edges 18, a short distance from the extremities of the member 13, affording open ended slots 19.

As shown in Fig. 7, the inner ring member 14, at its center is of approximately one half the thickness of the complete packing ring, and tapers therefrom to feather edges 20. A rib 21, extends circumferentially on the outer face of said ring member and is of a uniform thickness throughout, extending a short distance beyond the edges 20, forming the extremities of said ring member. The body of said ring member 14, forms a flanged portion on each side of said rib.

The operation is as follows:

In assembling the piston packing ring shown in Figs. 1 to 4, inclusive, the rib 3, fits into the grooves 10, and the rib 8, of the inner ring member 2, fits into the grooves 5, of the outer ring member 1. Since the outer faces of the ribs 3 and 8, are eccentric to the meeting faces of the ring members 1 and 2, and the floors or bottoms of the grooves 5 and 10, are also correspondingly eccentric to the meeting faces of said ring members, a circumferential interlock is established between said ring members 1 and 2, thereby preventing relative rotative movement of said members. The construction of said interfitting ring members is such that one can not turn around or within the other, and a relative lateral movement of the ring members is prevented by the interlocking engagement between the respective ribs and grooves. As clearly shown in Fig. 1, the interfitting ring members 1 and 2, produce a packing ring of uniform thickness throughout, the outer and inner faces of the complete packing ring being concentric.

In the modified form of the device shown in Figs. 5 to 8, inclusive, the rib 21, of the inner ring member 14, fits into the groove 17, of the outer ring member 13, with the flanged portions of said inner ring contacting with said outer ring member, forming a complete packing ring of uniform thickness throughout, the outer and inner faces thereof being concentric. There can be no relative rotative or turning movement between the ring members 13 and 14, due to the interlocking engagement of the eccentric meeting faces of the rib 21, and the groove 17.

While the complete packing ring, of each of the forms described is of uniform thickness throughout its entire extent, it is capable of readily contracting and expanding equally and uniformly at all points thereby maintaining perfect working contact with the inside wall of a cylinder in which it operates, thus insuring against leakage of steam, gas or other fluid, the outer face of the packing ring being practically continuous thus providing for retaining compression when used in internal combustion engines and further obtaining the highest efficiency of the engine. There is furthermore little or no possibility of scoring the cylinder wall, which frequently happens in the use of other types of piston packing rings, by reason of the thin projecting extremities of said packing ring.

I am aware that the details of construction may be varied through a wide range without departing from the principles of this invention, and I therefore do not purpose limiting the patent granted otherwise than necessitated by the prior art.

I claim as my invention:

1. In a packing ring of the class described, an outer and an inner split member of uniform thickness having eccentric grooves therein, one on each side of said split portion, an eccentric rib on each of said members circumferentially alined and diametrically opposite said respective grooves, said ribs and grooves arranged centrally between the top and bottom edges of said members, the grooves and rib of said inner member adapted to interfit with the rib and grooves of said outer member to afford an interlock between said members.

2. In a packing ring of the class described, an outer split ring member of uniform thickness, an eccentric rib integrally formed on the inner face thereof opposite the split in said member, said outer member having eccentric grooves in the inner face thereof diametrically opposite said rib, an inner split member of uniform thickness having eccentric grooves in the outer face thereof, and an eccentric rib integrally formed on the outer face of said inner member diametrically opposite said grooves, the grooves and rib of said inner member adapted to interfit with the rib and grooves of said outer member to afford an interlock between said members.

In testimony whereof I have hereunto subscribed my name in the presence of two subscribing witnesses.

CLARANCE R. BRYANT.

Witnesses:
 CHARLES W. HILLS, JR.,
 EARL M. HARDINE.